(12) United States Patent
Burkholz et al.

(10) Patent No.: US 12,496,427 B2
(45) Date of Patent: Dec. 16, 2025

(54) INTRAVENOUS CATHETER DEVICE HAVING A PROBE WITH A SELECTIVELY PERMEABLE DISTAL END

(71) Applicant: Becton, Dickinson and Company, Franklin Lakes, NJ (US)

(72) Inventors: Jonathan Karl Burkholz, Salt Lake City, UT (US); Weston F. Harding, Lehi, UT (US); Megan Scherich, Salt Lake City, UT (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 864 days.

(21) Appl. No.: 17/752,341

(22) Filed: May 24, 2022

(65) Prior Publication Data

US 2022/0379074 A1    Dec. 1, 2022

Related U.S. Application Data

(60) Provisional application No. 63/193,497, filed on May 26, 2021.

(51) Int. Cl.
   *A61M 25/00*    (2006.01)

(52) U.S. Cl.
   CPC ..... *A61M 25/00* (2013.01); *A61M 2025/0019* (2013.01)

(58) Field of Classification Search
   CPC .......... A61M 25/0017; A61M 25/0075; A61M 2025/0018; A61M 2025/0019
   See application file for complete search history.

(56) References Cited

U.S. PATENT DOCUMENTS

| | | | | |
|---|---|---|---|---|
| 3,841,308 | A | * | 10/1974 | Tate .................. A61M 25/0075 604/528 |
| 5,356,388 | A | * | 10/1994 | Sepetka ............ A61M 25/0069 604/524 |
| 5,605,162 | A | | 2/1997 | Mirzaee et al. |
| 2017/0238951 | A1 | | 8/2017 | Yang et al. |
| 2019/0021640 | A1 | * | 1/2019 | Burkholz ............... A61B 5/153 |
| 2019/0160266 | A1 | | 5/2019 | Ngo-Chu et al. |
| 2020/0147349 | A1 | | 5/2020 | Holt |
| 2020/0316346 | A1 | | 10/2020 | Burkholz et al. |
| 2021/0085929 | A1 | | 3/2021 | Ngo-Chu et al. |

FOREIGN PATENT DOCUMENTS

JP         2016174645 A      10/2016

* cited by examiner

*Primary Examiner* — Laura A Bouchelle
(74) *Attorney, Agent, or Firm* — The Webb Law Firm

(57) ABSTRACT

An intravenous catheter device can have a probe with a selectively permeable distal end. The probe can be inserted through a catheter while the catheter is positioned intravenously to facilitate fluid flow into or out from the catheter such as by removing an occlusion or repositioning the catheter. Due to its selective permeability, the distal end of the probe can minimize the likelihood of the probe becoming occluded while it is inserted intravenously and may provide control over the rate of fluid flow into or out from the catheter.

15 Claims, 7 Drawing Sheets

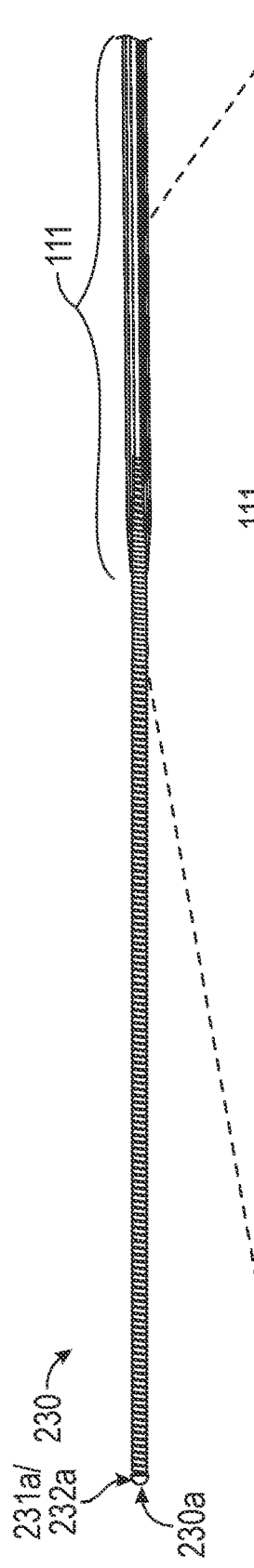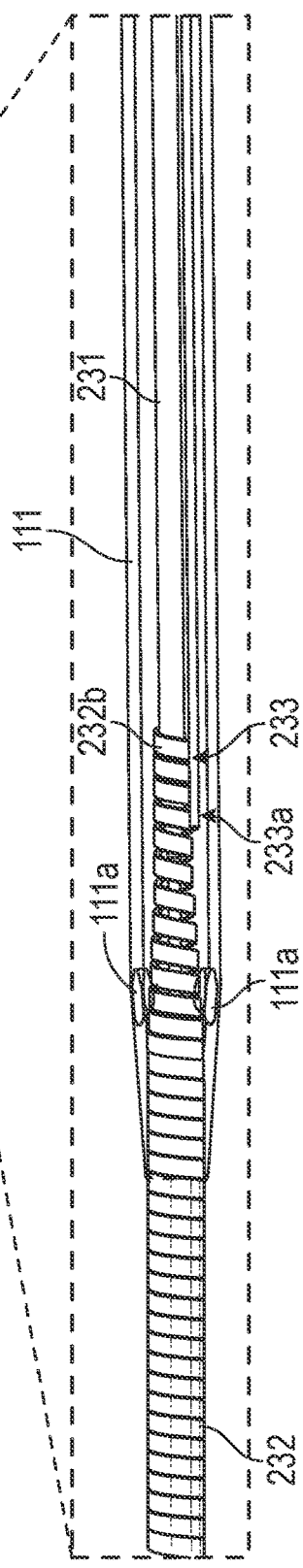
FIG. 2A
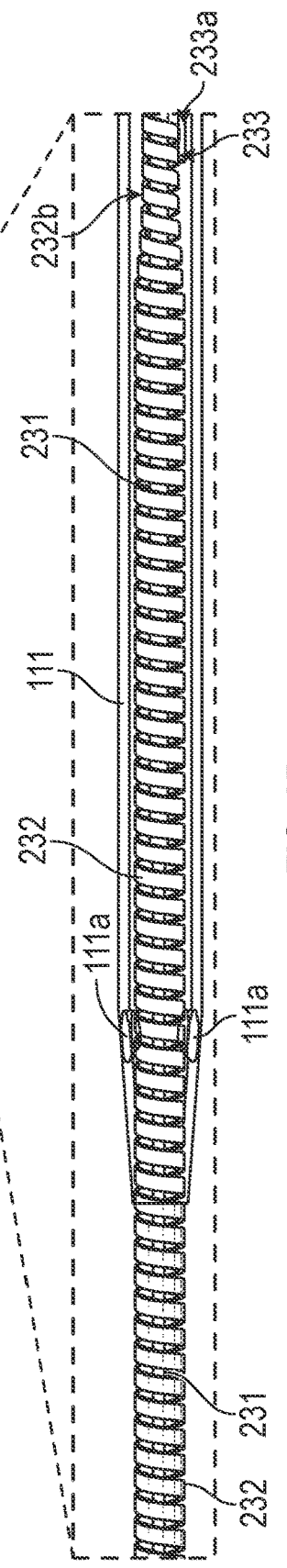
FIG. 2B

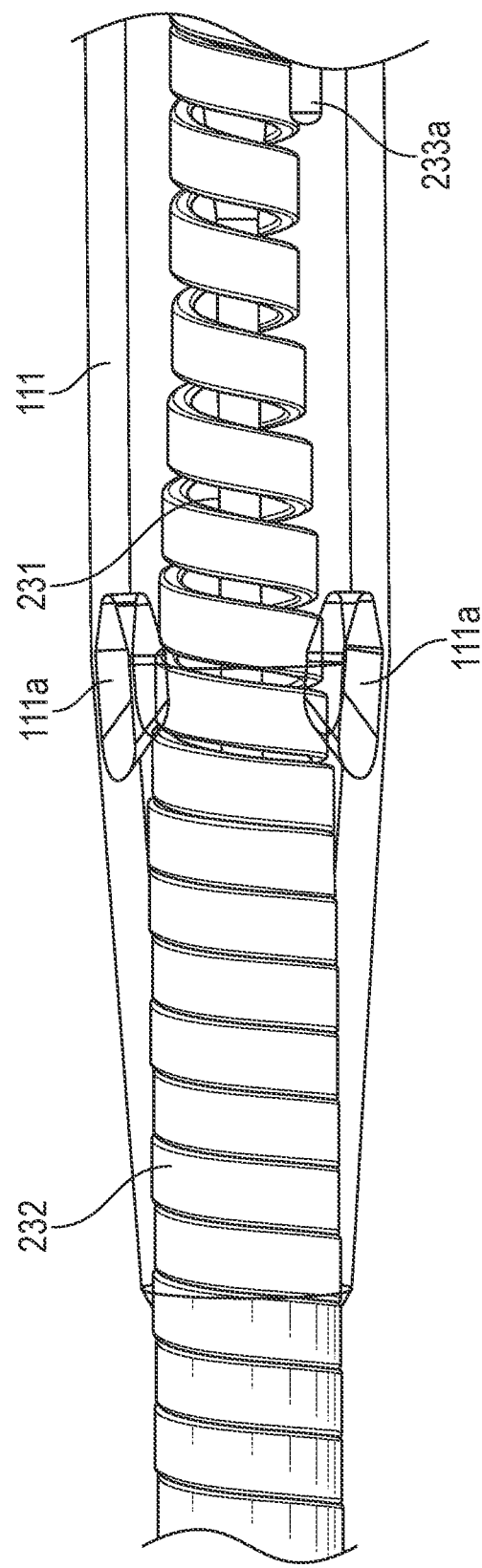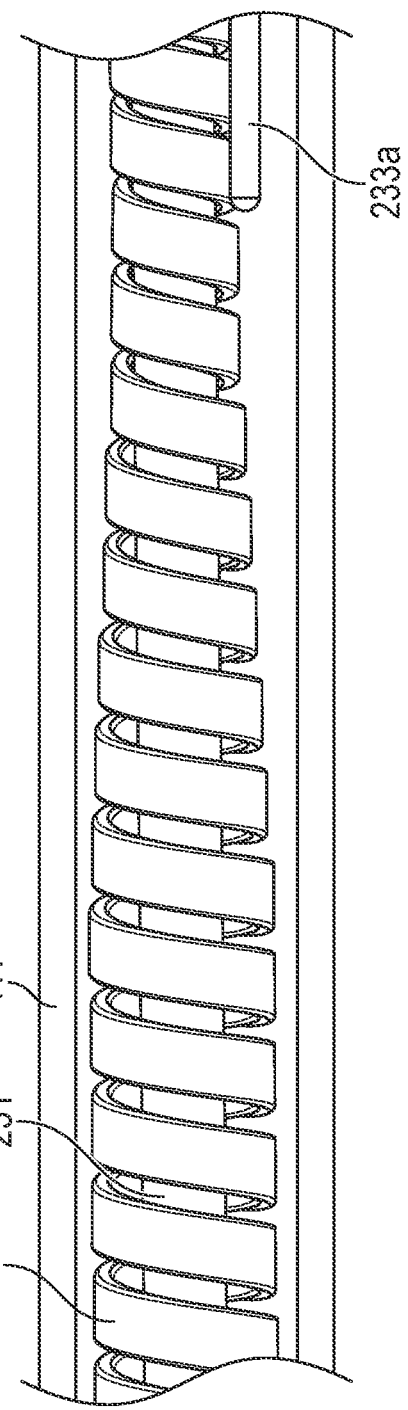
FIG. 4A
FIG. 4B

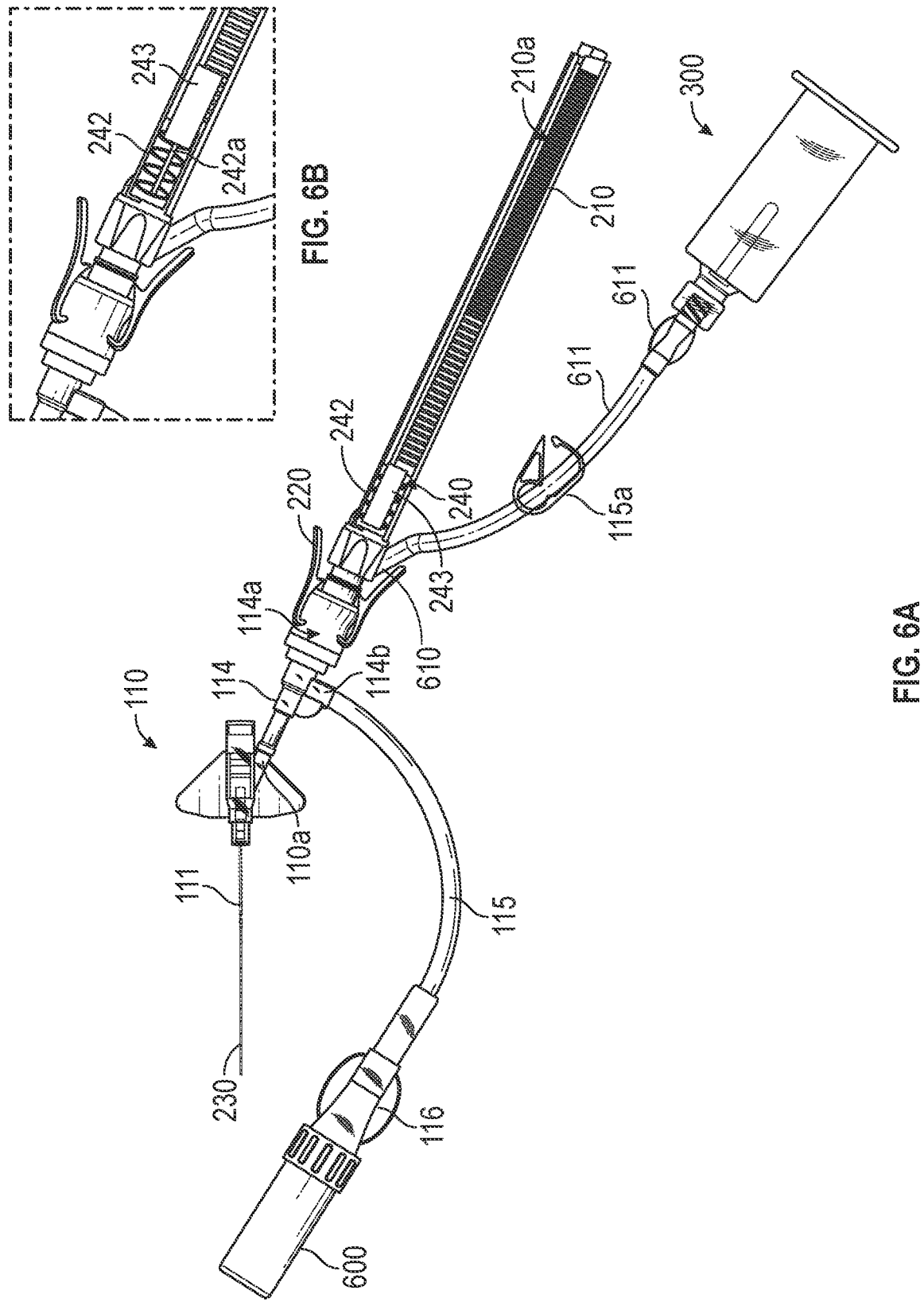

INTRAVENOUS CATHETER DEVICE HAVING A PROBE WITH A SELECTIVELY PERMEABLE DISTAL END

CROSS-REFERENCE TO RELATED APPLICATION

The present application claims priority to U.S. Provisional Application Ser. No. 63/193,497, entitled "Intravenous Catheter Device Having a Probe with a Selectively Permeable Distal End", filed May 26, 2021, the entire disclosure of which is hereby incorporated by reference in its' entirety.

BACKGROUND OF THE INVENTION

Intravenous (IV) catheter devices are commonly used for a variety of infusion therapies. For example, an IV catheter device may be used for infusing fluids, such as normal saline solution, various medicaments, and total parenteral nutrition, into a patient. IV catheter devices may also be used for withdrawing blood from the patient.

A common type of IV catheter device is an over-the-needle peripheral intravenous ("IV") catheter ("PIVC"). As its name implies, the over-the-needle catheter may be mounted over a needle having a sharp distal tip. The catheter and the needle may be assembled so that the distal tip of the needle extends beyond the distal tip of the catheter with the bevel of the needle facing up away from skin of the patient. The catheter and needle are generally inserted at a shallow angle through the skin into the vasculature of the patient. Once the catheter is positioned within the vasculature, it may become occluded such as when a thrombus forms around the catheter's distal opening or the distal opening is positioned against a vessel wall.

When IV catheter devices are not adequately maintained within the patient's vasculature, they are likely to become occluded. Once an IV catheter device is occluded, it may no longer be possible to use the IV catheter device to infuse fluids or withdraw blood. In such cases, the IV catheter device may be replaced. Yet, replacing an IV catheter device is burdensome for the patient and increases costs. To address such issues, some devices have been developed that can be inserted through the indwelling catheter of the IV catheter device to remove the occlusion. For example, some devices employ rigid tubing that can be inserted through the catheter and distally beyond the catheter's distal opening. With the rigid tubing inserted in this manner, such devices can obtain a blood sample through the rigid tubing even if the catheter had become occluded. In other words, the rigid tubing is employed to physically pass through any occlusion that may have formed in or around the catheter's distal opening and forms a separate fluid pathway from the catheter for collecting the blood sample. However, the single opening of the tubing may become occluded with thrombus as it is pushed through and beyond the occlusion.

The subject matter claimed herein is not limited to embodiments that solve any disadvantages or that operate only in environments such as those described above. Rather, this background is only provided to illustrate one example technology area where some implementations described herein may be practiced.

SUMMARY OF THE INVENTION

The present disclosure relates generally to an intravenous catheter device having a probe with a selectively permeable distal end. The probe can be inserted through a catheter while the catheter is positioned intravenously to facilitate fluid flow into or out from the catheter such as by moving an occlusion away from the catheter tip, removing an occlusion, accessing additional sources of blood and/or repositioning the catheter tip. Due to its selective permeability, the distal end of the probe can minimize the likelihood of the probe becoming occluded while it is inserted intravenously and may provide control over the rate of fluid flow into or out from the catheter.

In some embodiments of the present disclosure, a probe assembly may comprise a probe housing, a probe that extends within the housing with the probe having a selectively permeable distal end and a probe actuator that is configured to advance the probe from a proximal position to a distal position. The probe actuator may also be configured to manipulate the selectively permeable distal end. In some embodiments, the probe may include a core segment, a coil segment and a displacement segment. In some embodiments, the coil segment may form the selectively permeable distal end of the probe. in some embodiments, the probe actuator may move the displacement segment relative to the core segment to manipulate the selectively permeable distal end.

In some embodiments, a proximal end of the core segment may be coupled to the probe actuator and a distal end of the core segment may be coupled to a distal end of the coil segment. In some embodiment, a proximal end of the displacement segment may be coupled to the probe actuator and a distal end of the displacement segment may be coupled to a proximal end of the coil segment. In some embodiments, the probe actuator may manipulate the selectively permeable distal end by moving the proximal end of the displacement segment relative to the proximal end of the core segment. In some embodiments, the probe actuator may open the selectively permeable distal end by moving the proximal end of the displacement segment proximally relative to the proximal end of the core segment.

In some embodiments, the coil segment of the probe may include a capture region. In some embodiments, the coil segment of the probe may include a group of non-opening coils. In some embodiments, the coil segment of the probe may include coils of variable pitch.

In some embodiments of the present disclosure, an IV catheter device may include a catheter adapter from which a catheter extends distally and a probe assembly that is configured to couple to the catheter adapter. The probe assembly may include a probe housing, a probe that extends within the housing, the probe having a core segment, a coil segment and a displacement segment and a probe actuator that is configured to extend the probe distally from the catheter while the coil segment is in a closed position and to transition the coil segment into the open position after the probe is extended distally from the catheter.

In some embodiments, the coil segment may have a distal end that is coupled to the core segment and a proximal end that is coupled to the displacement segment. In some embodiments, the core segment may have a proximal end that is coupled to the probe actuator and the displacement segment may have a proximal end that is coupled to the probe actuator. In some embodiments, the probe actuator may transition the coil segment into the open position by moving the proximal end of the displacement segment relative to the proximal end of the core segment. In some embodiments, the coil segment may include a capture region.

In some embodiments, a method for accessing a vasculature may include accessing a probe assembly that is coupled to a catheter adapter having a catheter that is inserted into a patient's vasculature, the probe assembly comprising a probe housing, a probe that extends within the housing and a probe actuator. In some embodiments, the method may also include, while a distal end of the probe is in a closed position, sliding the probe actuator in a distal direction to cause the distal end of the probe to extend distally from the catheter. In some embodiments, the method may further include, after the distal end of the probe extends distally from the catheter, manipulating the probe actuator to cause the distal end of the probe to transition into an open position. In some embodiments, the probe may have a core segment, a coil segment and a displacement segment. In some embodiments, the probe actuator may be manipulated to cause the distal end of the probe to transition into the open position by manipulating the probe actuator to cause the displacement segment to move relative to the core segment. In some embodiments, the coil segment may have a distal end that is coupled to the core segment and a proximal end that is coupled to the displacement segment.

It is to be understood that both the foregoing general description and the following detailed description are exemplary and explanatory and are not restrictive of the invention, as claimed. It should be understood that the various embodiments are not limited to the arrangements and instrumentality shown in the drawings. It should also be understood that the embodiments may be combined, or that other embodiments may be utilized and that structural changes, unless so claimed, may be made without departing from the scope of the various embodiments of the present invention. The following detailed description is, therefore, not to be taken in a limiting sense.

BRIEF DESCRIPTION OF THE DRAWINGS

Example embodiments will be described and explained with additional specificity and detail through the use of the accompanying drawings in which:

FIG. 2A is a front view of a probe having a selectively permeable distal end in a closed position in accordance with the present invention;

FIG. 2B is a front view of a probe having a selectively permeable distal end in an open position in accordance with the present invention;

FIG. 4A is a partial side view of a selectively permeable distal end of a probe in the closed position in accordance with the present invention;

FIG. 4B is a partial side view of a selectively permeable distal end of a probe in the open position in accordance with the present invention;

FIG. 6A is a front view of an IV catheter device that includes a probe assembly in accordance with the present invention;

FIG. 6B is a close-up partial front view of a portion of the probe assembly of FIG. 6A.

DETAILED DESCRIPTION OF THE INVENTION

An IV catheter device that may be employed in some embodiments may include a catheter adapter from which a catheter distally extends and one or more ports or connectors for attaching other devices to the catheter adapter. Such devices may be attached to the catheter adapter before, during or after insertion of the catheter into a patient's vasculature and can include a needle assembly, a blood collection set, an infusion assembly, any embodiment of a probe assembly described herein, etc. Accordingly, embodiments of the present disclosure should not be limited to any particular configuration of an IV catheter device or to the specific examples of IV catheter devices used herein.

Figure 1:
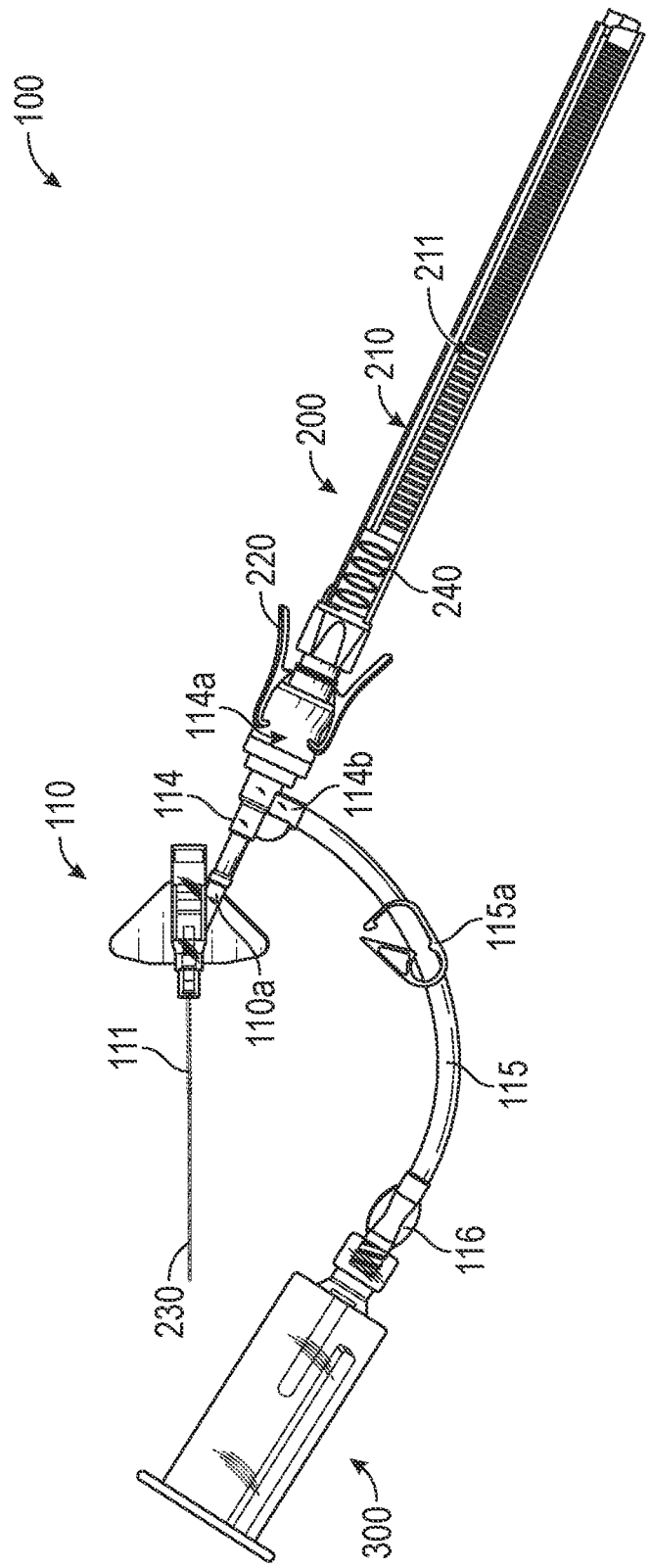
FIG. 1 is a front view of an IV catheter device that includes a probe assembly configured in accordance with the present invention.

FIG. 1 provides an example of an IV catheter device 100 that is configured in accordance with some embodiments of the present disclosure. IV catheter device 100 includes a catheter adapter 110 from which a catheter 111 extends distally. Although not shown, a needle assembly may oftentimes be secured to catheter adapter 110 and may be employed to insert catheter 111 into a patient's vasculature and subsequently detached from catheter adapter 110. IV catheter device 100 also includes an adapter 114 that is connected to a side port 110*a* of catheter adapter 110.

IV catheter device 100 also includes a probe assembly 200 having a probe housing 210 which can house a probe 230 at least when probe 230 is not extended through catheter 111. A connector 220 can be formed at a distal end of probe housing 210 and can function to connect probe assembly 200 to IV catheter device 100 (e.g., via a port 114*a* of adapter 114 as shown in FIG. 1). In other embodiments, however, probe housing 210 may be integrated into adapter 114 or another component of catheter adapter 110. In other words, how a probe assembly is connected to a catheter adapter is not essential to embodiments of the present disclosure.

Probe assembly 200 may also include a probe actuator 240 that extends out from probe housing 210 and slides along a channel 211 formed in probe housing 210. Probe actuator 240 allows a clinician to move probe 230 relative to catheter 111 by sliding probe actuator 240 along the length of probe housing 210 within channel 211. As described in detail below, a probe assembly configured in accordance with embodiments of the present disclosure may include a probe with a distal end having a permeability that a clinician can selectively control via probe actuator 240. Probe assembly 200, as depicted in FIG. 1, is only one example of how a probe assembly may be configured in embodiments of the present disclosure.

IV catheter device 100 also includes extension tubing 115 that is coupled at one end to a port 114*b* of adapter 114 and includes an adapter 116 at the opposing end. A blood collection set 300 may be coupled to or integrated with adapter 116. A clamp 115*a* may be positioned around extension tubing 115 to selectively block the flow of fluid through the extension tubing. FIG. 1 shows probe actuator 240 in its distal-most position and therefore the distal end of probe 230 is advanced distally out from the distal opening of catheter 111

A probe having a selectively permeable distal end may be used to bypass, move or remove an occlusion that may have formed around the distal opening of a catheter and/or to reposition the catheter such as when its distal opening may be occluded by a vessel wall or other vasculature structure. For example, after inserting catheter 111 into the patient's vasculature but prior to advancing probe 230 through catheter 111, a thrombus could form around catheter 111's opening and prevent blood or fluid from flowing through catheter 111. In such a case, probe actuator 240 could be moved into the distal-most position to advance probe 230, and particularly its selectively permeable distal end, distally out through the distal opening of catheter 111. The advancement of probe 230 through the distal opening would bypass, move or remove any occlusion that may have formed. Also, the selectively permeable distal end would allow the probe to remain closed while it passes through or by the thrombus and then opened to enable blood to be collected or fluid to be injected while probe 230 is positioned in and extends distally out through catheter 111's distal opening. This selective permeability can minimize the likelihood that probe 230 may become occluded.

FIGS. 2A and 2B provide examples of probe 230 in a closed and open position respectively when the probe is extended distally out from a catheter 111. As shown, probe 230 includes a core segment 231, a coil segment 232 and a displacement segment 233. In some embodiments, each of these segments may be in the form of a wire. In some embodiments, each segment may be formed by a separate wire, while in other embodiments, a single wire may form multiple segments or all the segments. For example, a single length of wire may have a core segment 231 that is substantially straight, a coil segment 232 that wraps around a distal portion of core segment 231 and a displacement segment 233 that is substantially straight and extends proximally from a proximal end of coil segment 232 in parallel with the core segment 231. As another example, core segment 231 could be formed by a first length of wire, coil segment 232 could be formed of a second length of wire and displacement segment 233 could be formed of a third length of wire where the three lengths of wire are welded, bonded or adhered together in any suitable manner. As a further example, core segment 231 and coil segment 232 could be formed from the same wire and displacement segment 233 could be formed for a different wire. The wire or wires from which probe 230 is formed could be made from a variety of materials including, for example, stainless steel, nickel titanium alloys such as Nitinol, and nickel, titanium and cobalt (NiTiCo) alloys.

Regardless of the number of wires that are employed to form probe 230, a distal end 231a of core segment 231 may be connected to a distal end 232a of coil segment 232 to form a distal end 230a of probe 230. In some embodiments, distal end 230a can be configured to form an atraumatic tip (e.g., by forming a rounded/smooth transition). Core segment 231 may be substantially straight with its distal portion extending within coil segment 232. In some embodiments, the length of coil segment 232 may be configured to cause proximal end 232b of coil segment 232 to be positioned within catheter 111 when probe 230 is in its distal-most position. For example, FIGS. 2A and 2B can both represent an embodiment where probe 230 is in its distal-most position and proximal end 232b of coil segment 232 remains within catheter 111. In other embodiments, however, coil segment 232 may be positioned entirely outside of catheter 111 when probe 230 is in its distal-most position.

Displacement segment 233 can extend along core segment 231 and can be coupled to proximal end 232b of coil segment 232. Displacement segment 233 can be configured to move distally and proximally relative to core segment 231 to thereby change the distance between distal end 232a and proximal end 232b of coil segment 232. In other words, displacement segment 233 is configured to change the length of coil segment 232. In particular, FIG. 2A shows coil segment 232 in a shortened/compressed state such that openings are not formed (or openings are minimal) between the adjacent coils of coil segment 232. Coil segment 232 can be moved into this closed position by moving distal end 233a of displacement segment 233 towards distal end 231a of core segment 231. In contrast, FIG. 2B shows coil segment 232 in a lengthened state such that openings are formed between the adjacent coils. Coil segment 232 can be moved into this open position by moving distal end 233a of displacement segment 233 away from distal end 231a of core segment 231.

When probe 230 is in the closed position, coil segment 232 may substantially block the flow of fluid into and out from catheter 111. For example, the outer diameter of coil segment 232 may substantially match the diameter of catheter 111's distal opening. Because the coils of coil segment 232 will be compressed together when probe 230 is in the closed position, fluid will be prevented from flowing into or out from the interior of coil segment 232 and will be prevented from flowing between the exterior of coil segment 232 and catheter 111's distal opening. In contrast, when probe 230 is in the open position, the coils of coil segment 232 will be spaced apart to thereby allow fluid to flow through the vein and around or along the thrombus, which may include flowing into or out from the interior of coil segment 232 for a portion of the coil length and therefore into or out from catheter 111. In some embodiments, catheter 111 may include one or more diffuser openings 111a that provide one or more additional fluid pathways into or out from catheter 111. In some embodiments, such as the embodiments represented in FIGS. 2A and 2B, coil segment 232 can be configured to cause its proximal end 232b to be positioned proximal to (or otherwise cover) diffuser openings 111a such that coil segment 232 will block the diffuser openings when probe 230 is in the closed position.

Figure 3A:
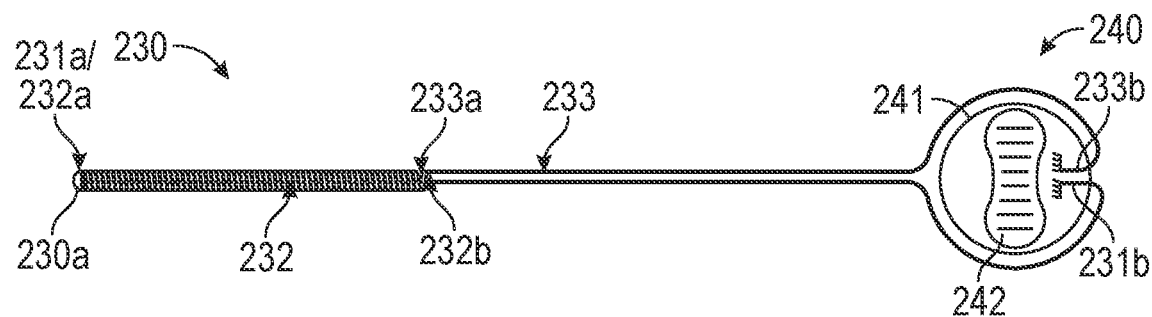
FIG. 3A is a front view of a probe assembly in accordance with the present invention.
Figure 3B:
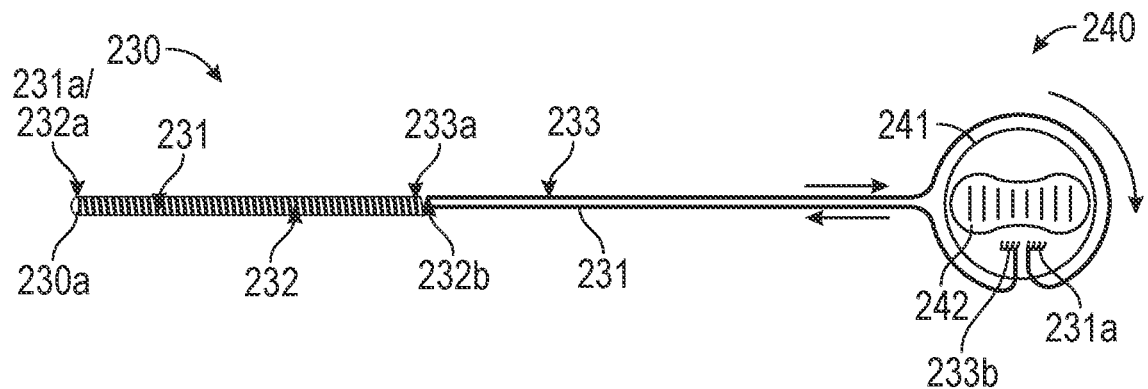
FIG. 3B is a front view of a probe assembly in accordance with the present invention.
Figure 3C:
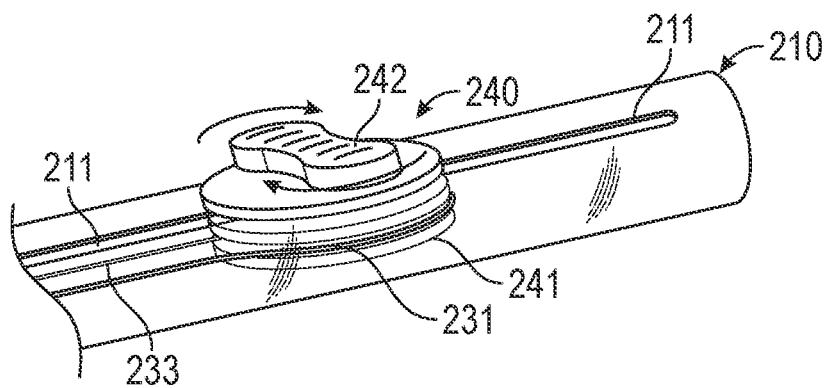
FIG. 3C is a partial perspective view of a probe assembly in accordance with the present invention.

Probe assembly 200 can be configured in a variety of ways to enable this selective permeability of probe 230's distal end. FIGS. 3A-3C provide one example. As shown, proximal ends 231b and 233b of core segment 231 and displacement segment 233 respectively can be connected to a base portion 241 of probe actuator 240. Base portion 241 may have a rounded shape with core segment 231 and displacement segment 233 being routed around opposing sides of the rounded shape. Probe actuator 240 may also include a tab 242 to enable a clinician to rotate probe actuator 240. As represented in FIG. 3A, probe actuator 240 could be configured to cause probe 230 to be in the closed position by default. For example, coil segment 232 could be configured to be closed (or compressed) absent an external force, or probe actuator 240 could otherwise be biased into the position shown in FIG. 3A. In other embodiments, coil segment 232 could be configured to be open absent an external force.

As represented in FIG. 3B, the rotation of probe actuator 240 can pull displacement segment 233 distally relative to core segment 231 thereby lengthening and opening coil segment 232. More specifically, the rotation pulls proximal end 232b of coil segment 232 distally while pushing distal end 231a of core segment 231 and therefore distal end 232a of coil segment 232 proximally.

As represented in FIG. 3C, probe actuator 240 can be configured to slide distally and proximally within channel 211 to thereby move distal end 230a of probe 230 distally and proximally respectively relative to catheter 111. For example, probe actuator 240 could be moved distally to extend probe 230 from catheter 111 and moved proximally to retract probe 230 into catheter 111. Once probe 230 is moved into a desired position (e.g., once extended from catheter 111), probe actuator 240 can be rotated to selectively open and close probe 230 as described above.

FIGS. 4A and 4B provide another example of probe 230 in the closed and open positions respectively. As shown in FIG. 4A, with probe 230 in the closed position, the gap between the coils of coil segment 232 is 0 (or near 0). In contrast, as shown in FIG. 4B, with probe 230 in the open position, the gap between the coils of coil segment 232 is greater than 0 (e.g., between 0.04" and 0.08", between 0.001" and 0.014" or any other reasonable range). FIGS. 4A and 4B also show how distal end 233a of displacement section 233 can be pulled proximally within catheter 111 when probe 230 is transitioned from the closed position to the open position. In some embodiments, probe 230 could transition from the closed position to the open position due solely to proximal movement of distal end 233a of displacement section 233. In other embodiments, probe 230 could transition from the closed position to the open position due solely to distal movement of the distal ends 231a and 232a of core segment 231 and coil segment 232 respectively. In other embodiments, probe 230 could transition from the closed position to the open position due to proximal movement of distal end 233a of displacement section 233 and distal movement of the distal ends 231a and 232a of core segment 231 and coil segment 232 respectively. Accordingly, the selective permeability of probe 230's distal end can be controlled using any relative movement between core segment 231 and displacement segment 233.

Figure 5A:
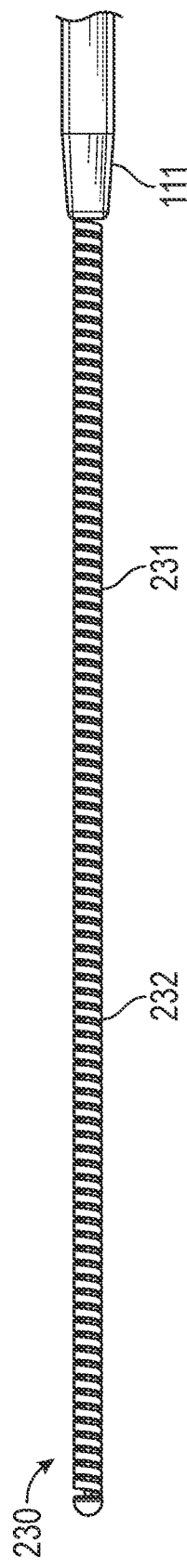
FIG. 5A is a partial side view of a probe in accordance with the present invention.
Figure 5B:
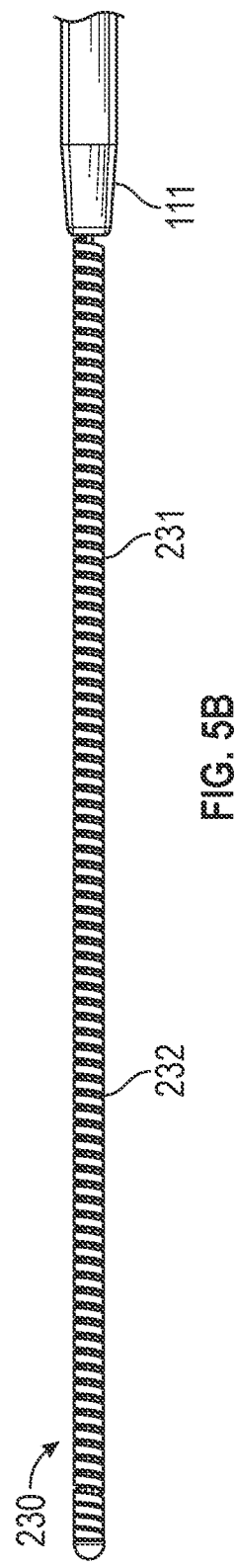
FIG. 5B is a partial side view of a probe in accordance with the present invention.

FIGS. 5A and 5B provide examples of probe 230 in the open position. In FIG. 5A, coil segment 232 of probe 230 is in the form of a flat wire. In contrast, in FIG. 5B, coil segment 232 of probe 230 is in the form of a round wire. Accordingly, embodiments of the present disclosure encompass a variety of wire shapes.

FIGS. 6A and 6B, which are similar to FIG. 1, provide another example of how probe actuator 240 may be configured to enable a clinician to control the selective permeability of probe 230. In FIGS. 6A and 6B, probe actuator 240 is in its distal-most position, and therefore, probe 230 extends distally out from catheter 111. Although not visible, in FIG. 6A, probe 230 is in the closed position, whereas in FIG. 6B, probe 230 is in the open position. Probe actuator 240 can include a sliding tab 243 that can be coupled to proximal end 233b of displacement segment 233. With sliding tab 243 in the distal position shown in FIG. 6A, displacement segment 233 will not be pulled proximally relative to core segment 231 thereby causing probe 230 to be closed. In contrast, when sliding tab 243 is slid proximally relative to tab 242 as shown in FIG. 6B, it will pull displacement segment 233 proximally thereby lengthening the distance between proximal end 232b and distal end 232a of coil segment 232. As stated above, in some embodiments, this proximal movement of displacement segment 233 alone may open probe 230. However, in some embodiments, probe actuator 240 may also include a second sliding tab (e.g., on the opposite side of probe actuator 240 from sliding tab 243) to which proximal end 231b of core segment 231 is connected. In such cases, this second sliding tab can be moved distally to move distal end 232a distally while tab 243 is moved proximally to move proximal end 232b proximally to thereby open probe 230.

FIGS. 6A and 6B also represent embodiments where probe assembly 200 forms a fluid pathway. For example, probe housing 210 is shown as including a port 610 from which extension tubing 611 extends. Blood collection set 300 can be connected to an adapter 611 at the end of extension tubing 611. In such embodiments, a needle-less connector 600 or other device can be coupled to adapter 116.

Figure 7:
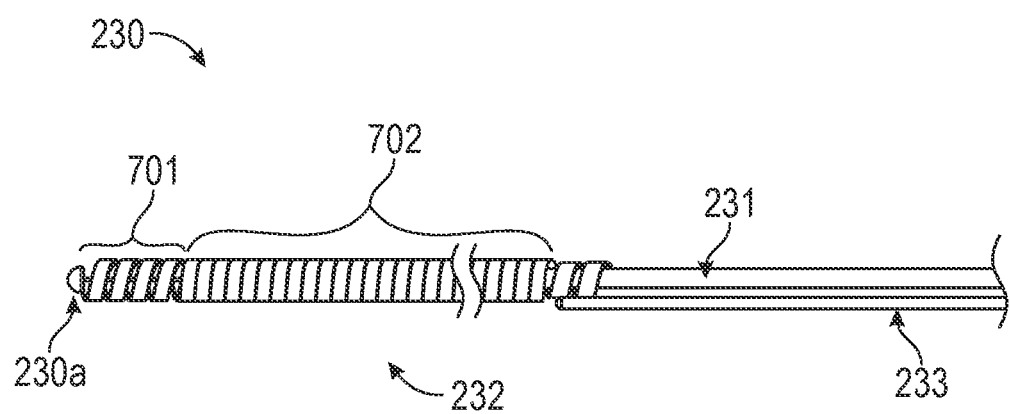
FIG. 7 is a partial side of a probe in accordance with the present invention.

In some embodiments, coil segment 232 may include a capture region that is open while the remaining length of the coil segment is in the closed position. FIG. 7 provides an example where probe 230 includes a coil segment 232 with a capture region 701. As shown, capture region 701 forms a distal length of coil segment 232 that is open while a proximal region 702 of coil segment 232 is closed. In some embodiments, the length of capture region 701 may be shorter than the length of proximal region 702. Because capture region 701 remains open, it can function to capture a thrombus or other occlusion while probe 230 is inserted into the vasculature in a closed position. For example, a thrombus may oftentimes form over the catheter's distal opening. In such cases, when probe 230 passes out of the catheter and through the thrombus, the thrombus may be captured in capture region 701 (e.g., between the coils that make up capture region 701) rather than covering or being positioned around proximal region 702. As a result, when probe 230 is opened (i.e., when proximal region 702 is opened), the thrombus will not be able to occlude the coils in proximal region 702. Although FIG. 7 provides an example where capture region 701 forms the distal end of coil segment 232, a capture region could also be formed along other lengths of coil segment 232 such as between two regions that are selectively permeable.

In some embodiments, coil segment 232 could include one or more adjacent coils that are glued, welded or otherwise secured together to prevent them from opening when coil segment 232 is open. In some embodiments, such "non-opening coils" could be located in a middle portion of coil segment 232 such that only the proximal and distal portions of coil segment 232 open. In such embodiments, the non-opening coils in the middle portion may prevent a thrombus—which may oftentimes be positioned by, around or adjacent to the middle portion of coil segment 232—from entering probe 230 when probe 230 is opened. In other embodiments, such non-opening coils could be located at different positions such as towards the distal end or proximal end of coil segment 232. In some embodiments, multiple groups of non-opening coils could be spaced along coil segment 232.

In some embodiments, coil segment 232 could be configured to cause adjacent coils to be spaced apart sufficiently to capture a thrombus when in the open position. For example, when collecting a blood sample via blood collection set, the vacuum tube could pull a thrombus inwardly between adjacent coils where it could become stuck. Then, when probe 230 is withdrawn, the thrombus will be removed from IV catheter device 100 thereby enhancing the patency of IV catheter device 100.

In some embodiments, the pitch of the coils in coil segment 232 may not be consistent along the length of coil segment 232. For example, coils towards the proximal end of coil segment 232 may have a smaller pitch than coils towards the distal end. Stated another way, when probe 230 is open, the gap between adjacent coils at the proximal end of coil segment 232 may be smaller than the gap between adjacent coils at the distal end of coil segment 232. In some embodiments, this variability in the gap size can be accomplished by the design/winding of coil segment 232 alone.

However, in other embodiments, multiple displacement segments 233 may be employed to apply different forces at different locations of coil segment 232 when probe actuator 240 is manipulated. For example, with reference to FIGS. 4A and 4B, an additional displacement segment 233 could be coupled to coil segment 232 at a point distal to the point where the depicted displacement segment 233 is coupled. In such a case, the proximal ends of each displacement segment 233 could be coupled to or manipulated by probe actuator 240 in different manners to thereby cause each displacement segment 233 to apply a different force when probe actuator 240 is turned, slid, etc.

Probe 230 has been described as having two discrete positions: an open position and a closed position. However, in any embodiment, probe 230 could have a closed position and variable open positions. For example, in the embodiment shown in FIGS. 3A-3C, probe actuator 240 could be rotated to open probe 230 to a desired amount. Likewise, in the embodiment shown in FIGS. 6A and 6B, sliding tab 243 could be slid to open probe 230 to a desired amount. Accordingly, probe actuator 240 could be configured in a wide variety of ways to cause probe 230 to have a single open position or many open positions. In some embodiments, this variability in the permeability can enable the clinician to control the rate of fluid or blood flow through probe 230.

In summary, a probe configured in accordance with embodiments of the present disclosure can have a selective permeable distal end. In a typical use case, the probe can be in a closed position while it is advanced distally from a catheter to a desired location within the patient's vasculature. By advancing the probe in the closed/compressed state as opposed to in the open/uncompressed state, the probe can provide greater stiffness to the catheter. Once positioned, the clinician can open the probe to collect a blood sample and/or to inject a fluid through the catheter. By inserting the probe in the closed position, the risk of a thrombus occluding the probe is minimized. Also, the clinician can control the degree to which the probe is opened (or more particularly, the spacing between coils) to thereby minimize the likelihood of a thrombus entering the probe while drawing blood.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A probe assembly comprising:
   a probe housing;
   a probe that extends within the probe housing, the probe having a core segment, a coil segment forming coils around at least a portion of the core segment and forming a selectively permeable distal end, and a displacement segment; and
   a probe actuator that is configured to advance the probe from a proximal position to a distal position, the probe actuator also being configured to manipulate the selectively permeable distal end,
   wherein the probe actuator moves the displacement segment relative to the core segment to manipulate the selectively permeable distal end.

2. The probe assembly of claim 1, wherein:
   a proximal end of the core segment is coupled to the probe actuator and a distal end of the core segment is coupled to a distal end of the coil segment; and
   a proximal end of the displacement segment is coupled to the probe actuator and a distal end of the displacement segment is coupled to a proximal end of the coil segment.

3. The probe assembly of claim 2, wherein the probe actuator manipulates the selectively permeable distal end by moving the proximal end of the displacement segment relative to the proximal end of the core segment.

4. The probe assembly of claim 3, wherein the probe actuator opens the selectively permeable distal end by moving the proximal end of the displacement segment proximally relative to the proximal end of the core segment.

5. The probe assembly of claim 3, wherein the probe actuator opens the selectively permeable distal end by moving the proximal end of the displacement segment proximally and moving the proximal end of the core segment distally.

6. The probe assembly of claim 1, wherein the coil segment includes a capture region.

7. The probe assembly of claim 1, wherein the coil segment includes a group of non-opening coils.

8. The probe assembly of claim 1, wherein the coil segment includes coils of variable pitch.

9. An IV catheter device comprising:
   a catheter adapter from which a catheter extends distally; and
   a probe assembly that is configured to couple to the catheter adapter, the probe assembly comprising:
   a probe housing;
   a probe that extends within the probe housing, the probe having a core segment, a coil segment forming coils around at least a portion of the core segment, and a displacement segment; and
   a probe actuator that is configured to extend the probe distally from the catheter while the coil segment is in a closed position and to move the displacement segment relative to the core segment to transition the coil segment into an open position after the probe is extended distally from the catheter.

10. The IV catheter device of claim 9, wherein the coil segment has a distal end that is coupled to the core segment and a proximal end that is coupled to the displacement segment.

11. The IV catheter device of claim 10, wherein the core segment has a proximal end that is coupled to the probe actuator and the displacement segment has a proximal end that is coupled to the probe actuator.

12. The IV catheter device of claim 11, wherein the probe actuator transitions the coil segment into the open position by moving the proximal end of the displacement segment relative to the proximal end of the core segment.

13. The IV catheter device of claim 12, wherein the coil segment includes a capture region.

14. A method for accessing a vasculature comprising:
   accessing a probe assembly that is coupled to a catheter adapter having a catheter that is inserted into a patient's vasculature, the probe assembly comprising a probe housing, a probe that extends within the probe housing and a probe actuator, wherein the probe has a core segment, a coil segment forming coils around at least a portion of the core segment, and a displacement segment;

while a distal end of the probe is in a closed position, sliding the probe actuator in a distal direction to cause the distal end of the probe to extend distally from the catheter; and after the distal end of the probe extends distally from the catheter, manipulating the probe actuator to move the displacement segment relative to the core segment to cause the distal end of the probe to transition into an open position.

15. The method of claim 14, wherein the coil segment has a distal end that is coupled to the core segment and a proximal end that is coupled to the displacement segment.

* * * * *